Nov. 11, 1969        E. F. MACKS        3,477,315
DYNAMOELECTRIC DEVICE WITH SPEED CHANGE MECHANISM
Filed Dec. 18, 1967        2 Sheets-Sheet 1

INVENTOR.
ELMER FRED MACKS
BY *Watts, Hoffman,
Fisher & Heinke*
ATTORNEYS

Nov. 11, 1969   E. F. MACKS   3,477,315
DYNAMOELECTRIC DEVICE WITH SPEED CHANGE MECHANISM
Filed Dec. 18, 1967   2 Sheets-Sheet 2

INVENTOR.
ELMER FRED MACKS
BY *Watts, Hoffmann,
Fisher & Heinke*
ATTORNEYS

United States Patent Office 3,477,315
Patented Nov. 11, 1969

3,477,315
DYNAMOELECTRIC DEVICE WITH SPEED CHANGE MECHANISM
Elmer Fred Macks, Willow Lane,
Vermilion, Ohio 44089
Filed Dec. 18, 1967, Ser. No. 691,590
Int. Cl. F16h *13/06*
U.S. Cl. 74—798                          17 Claims

ABSTRACT OF THE DISCLOSURE

A power device has a rotor section including coaxially disposed shafts journaled by spaced bearing sets, with at least one set being a drive speed change mechanism.

BACKGROUND OF THE INVENTION

Field of the invention

The present invention relates generally to speed change mechanisms and more particularly to a rolling contact bearing drive speed change mechanism for dynamoelectric and power machines. The present invention provides speed changes with a highly efficient, quiet, long-lived compact mechanism based upon elastohydrodynamic lubrication at the traction contacts. In many applications it is desirable to have an output from an electric motor or other prime mover such as a turbine, or an input to a generator, which rotates at a speed other than the speed of rotation of the rotor of the generator or prime mover. With all prior devices, such as a typical gear train, the speed change is effected by structure which is external of, and occupies space additional to, the space occupied by the basic machine.

Prior art

There have been proposals for ball bearing drive speed change mechanisms. These proposed speed change mechanisms utilize the ball cage of a ball bearing to effectuate a speed change. They take advantage of the approximately 2½ to 1 speed ratio which exists between the ball cage holding the balls of the bearing and the ball races.

Proposals for incorporating this principle take a number of forms, for example, the outer ball race may be fixed, the inner ball race driven, and the output taken off the ball cage for a speed reduction in a ratio of approximately 2½ to 1. If this construction is reversed so that the cage is driven, the output may be taken off the inner ball race for a speed increase in a ratio of approximately 2½ to 1. In special bearings this ratio may range from approximately 2 to 5.

These prior proposals for ball bearings drive mechanisms have, as compared with the construction of this invention:

(1) Had limited torque transmitting and load carrying capacities;
(2) Imposed excessive manufacturing costs;
(3) Required excessive space; and
(4) Had limited application because of these listed and other shortcomings such as relatively short life due to inability to carry relatively high eccentric or other loads where forces are applied transverse to the axis of an output shaft.

SUMMARY OF THE INVENTION

A power machine has a rotor and a stator mounted in a housing. In the constructions shown in the drawings where dynamoelectric machines are shown, the rotors are the armatures and each includes a hollow shaft surrounded by windings. An inner shaft is disposed coaxially in the hollow shaft and is journaled in axially spaced sets of bearings. One or both of these sets includes a rolling contact bearing constructed to function as a speed change mechanism.

With, as an example, a motor construction which uses coaxial shafts, a selected one of a wide variety of speed changes can be effected with a motor occupying a total space identical to the space of a conventional motor. Thus, the motor and speed change mechanism are both disposed within a conventional housing and no speed change structure is required external of the motor housing.

In one form of the invention, each bearing set comprises two ball bearings each with a stationary outer race connected to a housing or the like and a rotatable inner race. One inner race of a bearing of each set is connected to the hollow shaft and the other inner ball race of each set is connected to the coaxial shaft. Sets of roller contacts such as balls are confined between the races and provide bearing support for both shafts. A ball cage of one bearing of one set is connected to the coaxial shaft so that this bearing is a speed change mechanism. Alternately, one bearing cage of each set is connected to the coaxial shaft. The roller contacts of each speed change set are preloaded by a spring or the like in order to transfer rotational force from one shaft to the other without undue slippage. With this arrangement, the coaxial shaft is driven at a speed below that of the hollow shaft.

In a second form of the invention, each ball bearing set has two axially preloaded bearings, each with its outer ball race fixed to the hollow shaft. One inner ball race is connected to the housing and the other race is fixed to the inner coaxial shaft. The cages of the two bearings are interconnected to control the transfer of rotational force from one shaft to the other. With this arrangement, the coaxial shaft is provided with a very low-speed high-torque output.

In a third form of the invention, each of the bearing sets has two axially preloaded bearings, each with its inner ball race connected to the hollow shaft. One outer ball race is connected to the motor housing and a second outer race is fixed to the inner coaxial shaft which is again a low-speed high-torque output shaft. The ball cages are again interconnected to control the transfer of rotational force from one shaft to the other.

In a fourth form of the invention, each bearing set has a sleeve bearing and a single ball bearing with its outer ball race fixed to the housing and its inner ball race fixed to the coaxial output shaft. One or both of the ball cages are connected to the hollow rotor shaft to transfer rotational movement from one shaft to the other. A bearing preload spring axially biases the adjacent outer race to bias the bearing sets toward one another and to maintain an axial, slip inhibiting, load on the bearings. With this arrangement, a high speed output is provided at the inner coaxial shaft.

Four bearings are employed in each form shown. Rolling contact bearings need be employed only for bearing locations requiring speed change characteristics. The remaining bearings may be of the "sliding" rather than rolling contact variety.

In the above described forms of the invention, both the hollow shaft surrounded by the rotor element and the coaxial shaft are, for many applications, preferably coupled to one another through two axially spaced rolling contact bearing sets which provide speed change mechanisms disposed near the ends of the rotor. With this arrangement, drive torque is provided at two shaft locations rather than at one shaft location, and the required spring bias load on each bearing for an equivalent drive torque is essentially halved. The bearing fatigue life is thus theoretically increased by approximtaely 16 times $$\left[\left(\frac{1}{0.5}\right)^4 = 16\right]$$

over that life of an arrangement where only a single drive speed-change bearing is employed.

As compared with prior speed change mechanisms such as gear trains and prior proposed ball bearing drive mechanisms, the present invention has a number of distinct advantages. These include:

(1) Light-weight and compact construction requiring little space because no extra space is required for the speed change mechanism;

(2) Low cost because among other reasons tooling requirements are nominal as compared with prior practices and smaller bearings may be employed since the bearing life is greatly extended;

(3) a wide range of outputs at low cost because a desired speed change is effected by a far wider selection of appropriate bearings;

(4) Quietness and durability with much longer useful life for a given drive torque capability;

(5) Concentric construction at relatively low cost which is desirable in many applications and which has been conventionally accomplished in the past with expensive planetary gearing;

(6) High efficiency within certain applications, better efficiency than any prior art structure regardless of cost, space and other factors;

(7) The distinct advantage over prior ball drives of being capable of withstanding loads transverse to the output shaft with no increase in size or space envelope; and, (8) The provision in many constructions of a single, self agitating, lubricant chamber for all bearings with conventional bearing seals and without need for additional shaft seals.

Accordingly, a general object of the present invention is to provide a novel and improved rolling-contact bearing speed change mechanism for power devices.

Other objects and advantages and a fuller understanding of the invention will be realized from the following detailed description and claims taken in conjunction with the drawings.

DESCRIPTION OF THE PREFERRED EMBODIMENTS

Figure 1:
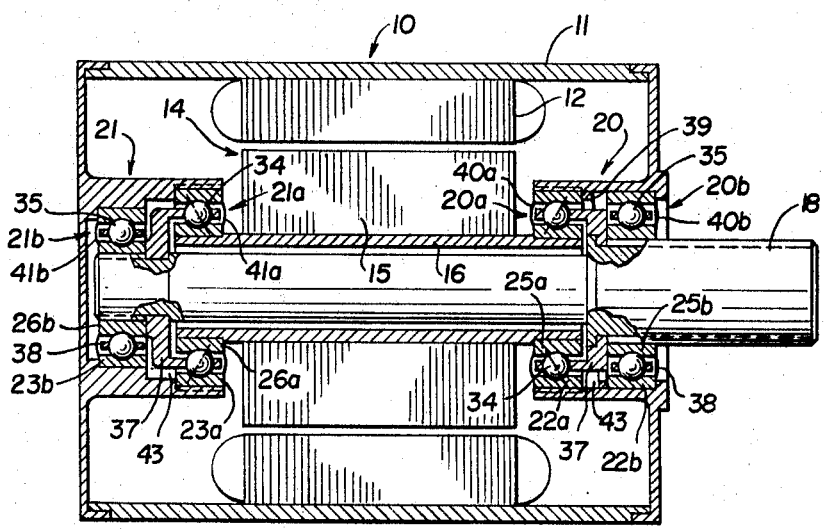
FIGURE 1 is a longitudinal sectional view of an electric motor and speed change mechanism of the present invention.

In one form of the invention shown in FIGURE 1, an electric motor 10 is provided with a housing 11. A field winding 12 is carried by the housing 11 to provide the motor stator. A rotor section 14 is disposed within the field winding 12. The rotor section 14 is composed of an armature winding 15 which surrounds and is fixed to a hollow shaft 16. An inner shaft 18 is surrounded by and is coaxial with the hollow shaft 16. The hollow shaft 16 and the coaxial shaft 18 are journaled in axially spaced bearing sets 20, 21 composed of bearings 20a, 20b and 21a, 21b respectively. In the arrangement shown in FIGURE 1, the shafts are coupled to one another through bearings 20a, 21a which are speed change bearings so that the bearing sets form a drive speed change mechanism.

The bearings of the sets 20, 21 include outer ball races 22a, 22b and 23a, 23b respectively. The outer race 22a is keyed to end bells of the housing, or otherwise mounted, in a manner to permit axial sliding under preload but so as to prevent relative rotation even under maximum torque and load. The outer race 23a is keyed or otherwise fixed against relative rotation. Inner ball races 25a, 26a are fixed to the hollow shaft 16. Inner ball races 25b, 26b of the external load support bearings of each set are fixed to the inner shaft 18. The ball races have circumferential grooves. The speed change bearings each have spaced roller contacts in the form of balls 34, confined in the grooves of and between the ball races 22a, 25a and 23a, 26a respectively. The load support bearings each have a plurality of circumferentially-spaced balls 35 confined in the grooves of and between the ball races 22b, 25b and 23b, 26b respectively.

Apertured, generally cup-shaped, annular ball torque-cages 37 are fixed to the inner shaft 18, as by a splined connection. The cages project into the spaces between the ball races 22a, 25a and 23a, 26a respectively to engage the balls 34. Other apertured, annular ball cages 38 are disposed between the ball races 22b, 25b and 23b, 26b respectively and engage the balls 35. The ball cages 37 are used in transferring rotational movement between the hollow shaft 16 and the inner shaft 18, whereas the ball cages 38 are used in a conventional manner to maintain the balls 35 in spaced positions.

A spring 39 is interposed between the outer races 22a, 22b of the bearings of the first set 20. Since the outer race 22b is axially fixed and outer race 22a is axially slidable, the spring preloads the speed change bearings 20a, 21a. This preload permits the transfer driving torque from shaft 16 through the elastohydrodynamic ball traction contacts between bales 34 and the raceway grooves the balls engage without undue slippage to output shaft 18.

Bearing seals 40a, 41a are provided between the ball races 22a, 25a and 23a, 26a respectively at their sides nearest the rotor section 14. Similarly, bearing seals 40b, 41b are provided between ball races 22b, 25b and 23b, 26b respectively at their sides farthest from the rotor section 14. The bearing seals, together with the shafts, the housing end bells and the bearing races define a lubricant chamber 43 within which a suitable lubricant may be retained.

In operation, with the electric motor 10 turned on, the rotor section 14 and the ball races 25a, 26a are caused to rotate. Rotation of the ball races 25a, 26a imparts rotation to the balls 34 relative to the rotationally stationary ball races 22a, 23a. The ball torque-cages 37 engaging the balls 34 are in turn caused to rotate and transfer rotation to the inner shaft 18. In the construction shown in FIGURE 1, the inner shaft 18 is caused to rotate at a lower speed than the hollow shaft 16, and the speed change mechanisms therefore function as speed reducers.

In the construction shown in FIGURE 1, the speed change bearings of each set 20, 21 should be essentially identical so the speeds transmitted to the inner shaft 18 by both torque-cages 37 are essentially equal. In applications where fatigue life of bearing set 20 is not of critical importance, a higher spring load is employed together with a conventional cage which replaces one of the cup-shaped cages 37. In that event only one of the bearings serves as a speed change mechanism resulting in a lower cost device since matching of two speed change bearings is not required.

Figure 2:
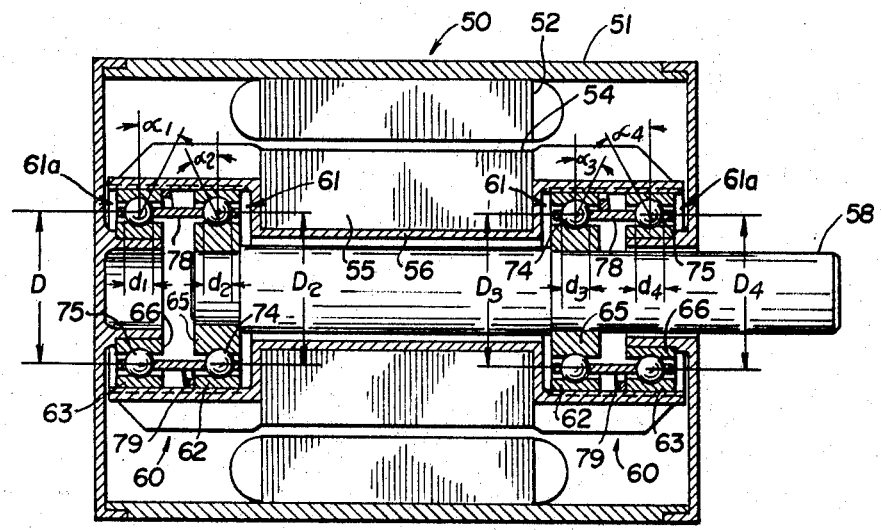
FIGURE 2 is a longitudinal sectional view of an electric motor and a second form of speed change mechanism.

In a second form of the invention shown in FIGURE 2, an electric motor 50 is provided with a housing 51, a field winding 52 fixed to the housing 51, and a rotor section 54 within the winding 52. The rotor section 54 has an armature winding 55 which surrounds and is fixed to a hollow shaft 56. An inner shaft 58 is coaxial with and surrounded by the hollow shaft 56. The hollow shaft 56 and the inner shaft 58 are coupled to one another through two axially spaced ball bearing sets forming drive speed-change mechanisms 60.

Each of the speed change mechanisms 60 includes an output bearing 61 and a housing bearing 61a. The bearings 61, 61a respectively, include outer ball races 62, 63 which are keyed, or so mounted to the hollow shaft 56, so as to permit axial sliding under spring preload and so as to prevent relative rotation even under maximum torque and load. A pair of inner ball races 65 are fixed both circumferentially and axially to the inner shaft 58 and within the races 62. A pair of stationary inner ball races 66 are fixed to the housing 51 and within the races 63. A plurality of circumferentially-spaced balls 74 are confined in grooves of and between each of the two pairs of ball races 62, 65. Similarly, a plurality of circumferentially-spaced balls 75 are confined in the grooves of and between each of the two pairs of ball races 63, 66. A pair of annular ball cages 78 are provided. Each of the cages 78 serve as a cage for both bearings of a set 60 engaging and rotating with one set of balls 74, and one set of balls 75.

Two springs 79 are provided for a dual drive as shown where matched sets of bearings are employed to transmit the drive torque from shaft 56 to the output shaft 58 through both common cages 78. Each spring 79 is interposed between one outer race 62 and the adjacent one of the outer races 63 to axially preload each bearing set. This axial preload prevents slippage at the ball traction contact between the balls and races.

In operation, with the electric motor 50 turned on, the rotor section 54, the hollow shaft 56, and the outer ball races 62, 63 are caused to rotate. Rotation of the outer ball races 62, 63 imparts rotation to the balls 75 against the stationary inner ball races 66. This imparts rotation to the bearing cages 78 causing rotation of the balls 74. While the cages 78 cause the balls 74 to orbit about the axis of the shafts 56, 58 at the same rate as the balls 75, they none the less impart a high torque, low speed output to the coaxial output shaft 58. This is accomplished by careful selection of certain bearing dimensions as follows: (1) pitch diameter D, (2) ball diameter $d$, (3) contact angle alpha $\alpha$.

The formula for selecting appropriate bearing dimensions for a desired output speed for a dual drive unit is:

$$N_S/N_R = \frac{d_1/D_1 \cos \alpha_1 - d_2/D_2 \cos \alpha_2}{1 - d_2/D_2 \cos \alpha_2}$$

$$= \frac{d_4/D_4 \cos \alpha_4 - d_3/D_3 \cos \alpha_3}{1 - d_3/D_3 \cos \alpha_3}$$

where the subscripts 1, 2, 3 and 4 refer to bearings from 1 on far left and proceeding to 4 on far right in FIG. 2. In the above formula, $N_S$ is the speed of rotation of the hollow shaft 56 and $N_R$ is the speed of rotation of the output shaft 58.

For the case of a single drive unit conventional bearings are provided as one of the sets 60 and one of the springs 79 is replaced by a spacer. The outer races of the conventional bearings of this one set may be a thumb-push fit so they can slide axially to accommodate axial preload. Since torque is not transmitted by these bearings, the outer races need not be keyed. If a single one of the sets 60 is a speed change mechanism, assuming it to be the left hand set of FIGURE 2, again numbering the bearings from left to right the formula is:

$$N_S/N_R = \frac{d_1/D_2 \cos \alpha_1 - d_2/D_2 \cos \alpha_2}{1 - d_2/D_2 \cos \alpha_2}$$

Figure 3:
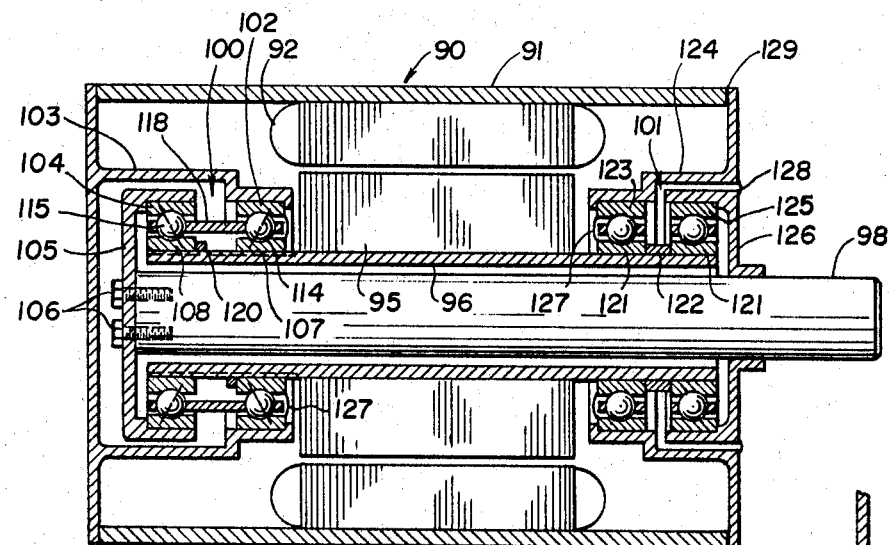
FIGURE 3 is a longitudinal sectional view of an electric motor and a third form of speed change mechanism.

In a third form of the invention shown in FIGURE 3, an electric motor 90 includes a housing tube 91, a field winding 92 fixed to the housing tube, and a rotor section 94 within the winding 92. The rotor section 94 includes an armature winding 95 and a hollow shaft 96 surrounded by and fixed to the armature 95. An inner shaft 98 is surrounded by and coaxial with the hollow shaft 96. In the illustration of FIG. 3, the hollow shaft 96 and the inner shaft 98 are journalled by spaced bearing sets 100, 101 and are coupled to one another through a single ball-bearing speed-change mechanism provided by the set 100 located at the left side of the rotor element 95.

The speed change mechanism 100 includes a stationary outer ball race 102 fixed to the housing and bell 103 and a rotatable outer ball race 104 fixed to the inner shaft 98 by annular cup shaped drive member 105 and screws 106. Rotatable inner ball races 107, 108 are within the races 102 and 104 respectively. The inner races 107, 108 are keyed, or otherwise mounted, to the hollow shaft 96 for axially slidable movement but no relative rotation thereon. A plurality of circumferentially-spaced balls 114 are confined in grooves of and between the ball races 102, 107. A plurality of circumferentially-spaced balls 115 are confined in grooves of and between the ball races 104, 108. An apertured annular ball cage 118, similar to the cage 78, engages the balls 114, 115 and is adapted to rotate with them. A bearing preload spring 120 is located between the inner races 107, 108 and axially preloads the bearing set 100 to a predetermined load value in order to transmit torque. The preload value and the spring are chosen to provide adequate elastohydrodynamic traction at the ball to raceway contact areas. This construction, like that of FIGURE 2, has a very low speed, high torque output essentially determined through the utilization of the above formula.

The bearings of the bearing set 101 are conventional ball bearings having inner races 121 fixed to the tubular shaft 96. The inner races 121 are maintained in spaced relationship by a spacer 122.

An outer race 123 of one bearing of the set 101 is carried by housing end bell 124 while the other outer race 125 is connected to the output shaft 98 by an annular coupling 126.

Oil seals 127 are carried by the axially innermost bearing of each set 100, 101. Another oil seal 128 is interposed between the end bell 124 and the coupling 126. The seals 127, 128, the bearings carrying the seals 127, the shafts 96, 98, the end bells 103, 124 and the coupling 126 define a lubricant chamber.

In the construction shown in FIGURE 3, shims 129 are interposed between the housing tube 90 and the end bell 124. These shims accommodate accummulating tolerance build-ups in the construction.

In the construction shown in FIGURE 3, shims 129 are interposed between the housing tube 90 and the end bell 124. These shims accommodate accummulating tolerance build-ups in the construction.

It will be apparent that the bearing set 101 may be modified through provision of a single bearing cage, replacement of the spacer 122 by a spring, and by properly mounted inner races to provide a second drive speed change mechanism in the FIGURE 3 construction.

Figure 4:
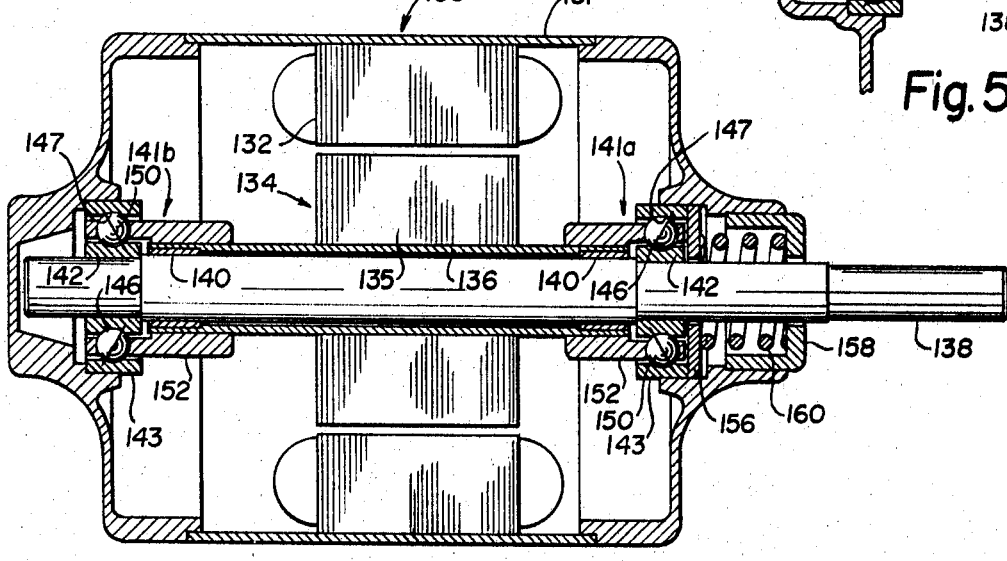
FIGURE 4 is a longitudinal sectional view of an electric motor and a fourth form of speed change mechanism; and, FIGURE 5 is an alternative embodiment of one speed change mechanism shown in FIGURE 4.

In a fourth form of the invention shown in FIGURE 4, an electric motor 130 includes a housing 131, a field winding 132 fixed to the housing 131, and a rotor section 134 within the field winding 132. The rotor section 134 includes an armature winding 135 mounted on a hollow shaft 136. An inner shaft 138 is coaxial with and surrounded by the hollow shaft 136. In this form each bearing set includes a sleeve bearing 140 disposed between the shafts 136 and 138 to provide radial support. The hollow shaft 136 and the inner shaft 138 are coupled through ball bearing speed change mecanisms 141a, b located at axially spaced locations on opposite sides of the armature winding 135.

Each of the speed change mechanisms 141a, b includes a movable inner ball race 142 fixed to the inner shaft 138 and a stationary outer ball race 143 fixed to the housing 131. The ball races 142, 143 have grooves 146, 147, respectively, formed in them. A plurality of circumferentially spaced balls 150 are confined between the ball races 142, 143 in the grooves.

Apertured, annular ball cages 152 are fixed to the ends of the hollow shaft 136 and project between the ball races 142, 143 to engage the balls 150. As in all embodiments, one of the ball bearing sets may be modified by using a conventional bearing cage as described in greater detail in connection with FIGURE 1 so that a single speed change mechanism is provided for relatively low torque applications.

The speed change mechanism 141a includes a washer 156 positioned around the shaft 138 and between the housing 131 and the outer faces of ball races 142, 143. The washer 156 abuts the outer ball races 143 but is spaced from the ball race 142. An annular cup 158 is threaded into the housing 131 and surrounds the inner shaft 138 near its outer end. A helical spring 160 surrounds the inner shaft 138 and abuts against the cup 158 and the washer 156 providing an adjustable preload on the bearings of the speed change mechanisms to inhibit slippage.

In operation, with the electric motor 130 turned on, the rotor section 134, the shaft 136, and the ball cages 152 are caused to rotate. Rotation of the ball cages 152 imparts rotation to the balls 150 against the stationary outer ball race 143, causing the inner ball race 142 and the inner shaft 138 to rotate at an increased speed.

Figure 5:
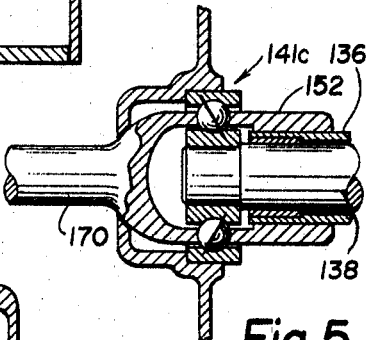

In the alternative arrangement shown in FIGURE 5, a speed change mechanism 141c differs from its counterpart 141b in one respect. A shaft portion 170 has been connected to the ball cage 152. The shaft portion 170 rotates at the same speed as the hollow shaft 136. With this alternative form, two output speeds are provided, one at high speed on the inner shaft 138 and another at the primary drive speed on the shaft portion 170.

In the above-described forms of the invention, an electric motor utilizes the hollow shaft to drive the inner shaft. In contrast, if the motor is instead a generator, the inner shaft may be used to drive the hollow shaft. Thus, it is contemplated that both the hollow shaft and the inner shaft may function as driving or driven shafts, depending upon the particular application of the invention. Moreover, in all embodiments the power device may be a turbine in which the armature is replaced by turbine blades and the field by suitable nozzles.

Many modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:
1. A power transmitting machine comprising:
 (a) coaxially disposed rotor, stator and shaft elements;
 (b) first and second axially spaced bearing sets each journally each of the elements for relative rotation;
 (c) each of said sets including at least two spaced bearings; and,
 (d) one of said bearing sets including means coupling the shaft and rotor elements in driving relationship such that a selected one of the shaft and rotor elements drives the other of the shaft and rotor elements at a rotational speed different than the rotational speed different than the rotational speed of the selected element.

2. A power transmitting device comprising:
 (a) a stator section;
 (b) a rotor section;
 (c) axially spaced bearing sets journalling the rotor section in the stator section;
 (d) each of said sets including at least two spaced bearings;
 (e) said rotor section including a tubular shaft;
 (f) an inner shaft coaxially disposed within said tubular shaft;
 (g) said bearing sets journalling said inner shaft; and,
 (h) one of said bearing sets including speed change means drivingly coupling said hollow shaft and said inner shaft.

3. A dynamoelectric device comprising:
 (a) a housing;
 (b) a field winding mounted in and carried by the housing;
 (c) a tubular shaft disposed within the housing;
 (d) an armature carried by said tubular shaft;
 (e) an inner shaft disposed coaxially within the tubular shaft;
 (f) first and second spaced bearing sets journalling the shafts in the housing for rotation relative to the housing and relative to one another;
 (g) each of said sets including at least two spaced bearings;
 (h) one bearing of one bearing set being a preloaded rolling contact bearing including inner and outer race elements and a cage element;
 (i) a first one of the bearing elements being coupled to the hollow shaft, a second one of the bearing elements being coupled to the inner shaft, and the third one of the bearing elements being otherwise coupled; and,
 (j) said bearing elements and the couplings thereof providing a driving connection between said shafts.

4. The device of claim 1 wherein the third element is coupled to the housing.

5. The device of claim 1 wherein the third element is the cage element and is coupled to the cage of another rolling contact bearing in the same set.

6. The device of claim 1 wherein the third bearing element is coupled to another bearing of the one set.

7. The device of claim 1 wherein the first bearing element is the inner race, the second bearing element is the cage, and the third bearing element is the outer race coupled to the housing.

8. The device of claim 1 wherein the first bearing element is the outer race, the second bearing element is the inner race, and further including another bearing of said one bearing set with an outer race coupled to the hollow shaft, an inner race coupled to the housing and a common cage with the one bearing.

9. The device of claim 1 wherein the first bearing element is the inner race, the third bearing element is the outer race coupled to the housing, and further including another bearing of said one bearing set with an inner race coupled to the hollow shaft, an outer race coupled to the inner shaft and a common cage with the one bearing.

10. The device of claim 1 wherein the first bearing element is the cage, the second bearing element is the inner race, and the third bearing element is the outer race coupled to the housing.

11. The device of claim 1 wherein the first and second bearing sets provide a driving connection between said shafts.

12. The device of claim 1 wherein said preload is provided by a bias means acting on said one bearing.

13. The device of claim 1 wherein the first bearing element is the cage coupled to an additional shaft.

14. A dynamoelectric device comprising:
 (a) a housing;
 (b) a field winding mounted in and carried by the housing;
 (c) a tubular shaft;
 (d) an inner shaft disposed coaxially within the tubular shaft;
 (e) first and second spaced bearing sets journalling the shafts in the housing for rotation relative to the housing and relative to one another;
 (f) each of said sets including at least two spaced bearings;
 (g) one bearing of one bearing set being a preloaded rolling contact bearing including inner and outer race elements and a cage element;

(h) a first one of the bearing elements being coupled to the hollow shaft, a second one of the bearing elements being coupled to the inner shaft, and the third one of the bearing elements being otherwise coupled;

(i) said bearing elements and the couplings thereof providing a driving connection between said shafts; and, (j) an armature carried by said tubular shaft between the spaced bearings sets such that the bearings are on opposite sides of said armature.

15. The device of claim 14 wherein one bearing of each bearing set includes a preloading rolling contact bearing including inner and outer race elements and a cage element and wherein as to each such preloaded bearing a first one of the elements is coupled to the hollow shaft, a second one of the elements is coupled to the inner shaft, and the third one of said elements is otherwise coupled.

16. The device of claim 2 wherein both bearing sets include means coupling the shaft and rotor elements in driving relationship such that a selected one of the shaft and rotor elements drives the other through both bearing sets.

17. The device of claim 2 wherein each of said bearing sets includes speed change means drivingly coupling the hollow and inner shafts.

References Cited

UNITED STATES PATENTS

| | | | |
|---|---|---|---|
| 2,536,803 | 1/1951 | Gleason | 74—798 X |
| 2,750,160 | 6/1956 | Englund et al. | 74—798 X |
| 3,001,420 | 9/1961 | Juenke | 74—798 |
| 3,008,061 | 11/1961 | Mims et al. | 74—798 X |
| 3,011,364 | 12/1961 | Mims | 74—798 |
| 3,178,963 | 4/1965 | Musser | 74—640 |

ARTHUR T. McKEON, Primary Examiner

U.S. Cl. X.R.

310—83

PO-1050
(5/69)

UNITED STATES PATENT OFFICE
CERTIFICATE OF CORRECTION

Patent No. 3,477,315            Dated November 11, 1969

Inventor(s) Elmer Fred Macks

It is certified that error appears in the above-identified patent and that said Letters Patent are hereby corrected as shown below:

Column 1, first line of third full paragraph under "prior art", delete "bearings" substitute - - bearing - -

Column 4, line 37 (line 7 of third full paragraph) delete "bales" substitute - - balls - -

Column 6, last line of first full paragraph, delete "formula" substitute - - formulas - -

Column 6, delete the sixth full paragraph in its entirety.

Claim 1, line 4, delete "journally" substitute - - journalling -

Claim 4-13, line 1, delete "1" substitute - - 3 - -

Claim 15, line 2, "preloading" should be - - preloaded - -

SIGNED AND
SEALED
JUN 2 1970

(SEAL)
Attest:

Edward M. Fletcher, Jr.
Attesting Officer

WILLIAM E. SCHUYLER, JR.
Commissioner of Patents